United States Patent
Umeno et al.

(10) Patent No.: US 10,376,839 B2
(45) Date of Patent: Aug. 13, 2019

(54) EXHAUST GAS PURIFICATION CATALYST FOR LEAN BURN ENGINE

(71) Applicant: UMICORE SHOKUBAI JAPAN CO., LTD., Tokoname (JP)

(72) Inventors: Takahiro Umeno, Tokoname (JP); Masaya Hanzawa, Tokoname (JP); Yoshiyuki Hayashi, Tokoname (JP)

(73) Assignee: UMICORE SHOKUBAI JAPAN CO., LTD., Tokoname-Shi, Aichi (JP)

( * ) Notice: Subject to any disclaimer, the term of this patent is extended or adjusted under 35 U.S.C. 154(b) by 0 days.

(21) Appl. No.: 15/111,643

(22) PCT Filed: Jan. 19, 2015

(86) PCT No.: PCT/JP2015/051276
§ 371 (c)(1),
(2) Date: Jul. 14, 2016

(87) PCT Pub. No.: WO2015/111555
PCT Pub. Date: Jul. 30, 2015

(65) Prior Publication Data
US 2016/0346731 A1  Dec. 1, 2016

(30) Foreign Application Priority Data

Jan. 22, 2014 (JP) ................. 2014-009810

(51) Int. Cl.
*B01D 53/94* (2006.01)
*B01J 23/63* (2006.01)
(Continued)

(52) U.S. Cl.
CPC ............ *B01D 53/945* (2013.01); *B01J 23/63* (2013.01); *B01J 35/04* (2013.01); *B01J 37/0225* (2013.01);
(Continued)

(58) Field of Classification Search
CPC .......... B01D 2255/2042; B01D 53/945; B01D 2255/40; B01D 2255/2092;
(Continued)

(56) References Cited

U.S. PATENT DOCUMENTS

2003/0134743 A1   7/2003  Sumida et al.
2010/0061903 A1*  3/2010  Kohara ............. B01D 53/9468
                                              423/213.2
(Continued)

FOREIGN PATENT DOCUMENTS

CN   101568381 A   10/2009
EP     0905354 A2   3/1999
(Continued)

OTHER PUBLICATIONS

International Preliminary Report on Patentability dated Jul. 26, 2016 which issued in the corresponding Patent Application No. PCT/JP2015/051276, including English translation.
(Continued)

*Primary Examiner* — Amber R Orlando
*Assistant Examiner* — Syed T Iqbal
(74) *Attorney, Agent, or Firm* — Dickinson Wright PLLC (57) ABSTRACT

It is an object to provide an exhaust gas purification catalyst for a lean burn engine having sufficient NOx purification performance.
The exhaust gas purification catalyst for a lean burn engine according to the present invention has a catalyst component including noble metal and ceria supported on a three-dimensional structure. In the whole catalyst, the supported amount of ceria per 1 L of catalyst is 140 to 300 g/L, and in the whole catalyst, is 50 to 98% by mass with respect to the whole coated amount. Furthermore, it is characterized that 50% by mass or more of ceria is included in the same catalyst layer in which noble metal is included, and the amount of noble metal included in the catalyst layer is 0.1% by mass or more with respect to the amount of ceria included in the catalyst layer.

17 Claims, 3 Drawing Sheets

(51) Int. Cl.
  *B01J 37/02* (2006.01)
  *B01J 35/04* (2006.01)
  *F01N 3/28* (2006.01)
  *B01J 37/16* (2006.01)
  *B01J 35/02* (2006.01)
  *B01J 35/10* (2006.01)

(52) U.S. Cl.
  CPC ..... *B01J 37/0244* (2013.01); *B01D 2251/208* (2013.01); *B01D 2255/1021* (2013.01); *B01D 2255/1023* (2013.01); *B01D 2255/1025* (2013.01); *B01D 2255/2022* (2013.01); *B01D 2255/2027* (2013.01); *B01D 2255/2042* (2013.01); *B01D 2255/2047* (2013.01); *B01D 2255/2063* (2013.01); *B01D 2255/2065* (2013.01); *B01D 2255/2092* (2013.01); *B01D 2255/40* (2013.01); *B01D 2255/9022* (2013.01); *B01D 2258/012* (2013.01); *B01J 35/023* (2013.01); *B01J 35/1019* (2013.01); *B01J 37/0248* (2013.01); *B01J 37/16* (2013.01); *B01J 2523/00* (2013.01); *F01N 3/28* (2013.01); *Y02C 20/20* (2013.01); *Y02T 10/22* (2013.01)

(58) Field of Classification Search
  CPC ...... B01D 2251/208; B01D 2255/1021; B01D 2255/1023; B01D 2255/1025; B01D 2255/2022; B01D 2255/2027; B01D 2255/2047; B01D 2255/2063; B01D 2255/2065; B01D 2255/9022; B01D 2258/012; B01J 37/0225; B01J 35/04; B01J 37/0244; B01J 23/63; B01J 2523/00; B01J 35/1019; B01J 35/023; B01J 37/16; B01J 37/0248; Y02T 10/22; Y02C 20/20; F01N 3/28
  See application file for complete search history.

(56) References Cited

U.S. PATENT DOCUMENTS

| | | |
|---|---|---|
| 2010/0204036 A1 | 8/2010 | Sato et al. |
| 2011/0041486 A1* | 2/2011 | Kato .................. B01D 53/945 60/299 |
| 2014/0171302 A1 | 6/2014 | Jung |
| 2015/0352495 A1 | 12/2015 | Hoyer et al. |
| 2016/0051930 A1 | 2/2016 | Hoyer et al. |
| 2016/0082427 A1 | 3/2016 | Adam et al. |

FOREIGN PATENT DOCUMENTS

| | | | |
|---|---|---|---|
| EP | 2769760 A1 | | 8/2014 |
| EP | 3020473 A1 | | 5/2016 |
| JP | A-H11-156159 | | 6/1999 |
| JP | A-2001-123827 | | 5/2001 |
| JP | A-2001-219070 | | 8/2001 |
| JP | A-2001-248471 | | 9/2001 |
| JP | A-2002-011347 | | 1/2002 |
| JP | 2005138100 A | | 6/2005 |
| JP | A-2006-326437 | | 12/2006 |
| JP | A-2009-022821 | | 2/2009 |
| JP | 2009221913 A | * | 10/2009 |
| JP | A-2009-221913 | | 10/2009 |
| JP | A-2010-104910 | | 5/2010 |
| JP | A-2013-063404 | | 4/2013 |
| JP | A-2013-536757 | | 9/2013 |
| WO | WO 2008/093471 A1 | | 12/2007 |
| WO | WO 2012/029051 A1 | | 3/2012 |

OTHER PUBLICATIONS

International Search Report dated Mar. 4, 2015 in PCT Application No. PCT/JP2015/051276.
Chinese Office Action dated May 4, 2017 which issued in the corresponding Patent Application No. 201580005086.X, including English translation.
European Search Report dated Aug. 28, 2017 which issued in the corresponding Patent Application No. 15740039.1.
Office Action in related Chinese Application No. 201580005086.X, dated Feb. 5, 2018.
Indian Office Action dated Aug. 27, 2018, which issued in the corresponding Indian Patent Application No. 201647026021, including English translation.
Chinese Office Action dated Sep. 5, 2018, which issued in the corresponding Chinese Patent Application No. 201580005086.X, including English translation.
European Office Action dated May 29, 2019, which issued in the corresponding European Patent Application No. 15 740 039.1.
Chinese Office Action dated Apr. 3, 2019, which issued in corresponding Patent Application No. 201580005086.X, including English translation.

* cited by examiner

EXHAUST GAS PURIFICATION CATALYST FOR LEAN BURN ENGINE

TECHNICAL FIELD

The present invention relates to an exhaust gas purification catalyst for a lean burn engine. More specifically, the present invention relates to an exhaust gas purification catalyst for purifying hydrocarbon (HC), carbon monoxide (CO), nitrogen oxide (NOx) and the like included in an exhaust gas from a lean burn internal combustion engine such as a gasoline lean burn engine or a diesel engine, in particular to a technology to improve the NOx purification performance.

BACKGROUND ART

NOx in the atmosphere leads to a photochemical smog or acid rain. Accordingly, discharge of NOx from cars or the like equipped with an internal combustion engine that is one of the NOx generating sources becomes a social problem. Therefore, it has been under consideration to make laws and regulations strict for discharge of NOx in the future.

Although a diesel engine or a gasoline lean burn engine is advantageous from a viewpoint of fuel efficiency, such an engine is known to have a large amount of NOx generated. This is because such an engine is in a lean burn manner in which a leaner air-fuel mixture compared to the theoretical air/fuel ratio is burned, so that when the combustion temperature reaches high temperature, large amounts of nitrogen and oxygen included in the air react with each other, etc. In addition, it is difficult to sufficiently reduce NOx because a lot of oxygen is included also in an exhaust gas in a lean atmosphere.

Conventionally, various NOx purification technologies have been proposed. For example, a method for absorbing and treating NOx is proposed, including causing a catalyst to absorb NOx in a lean atmosphere, and subsequently introducing CO or HC by engine control to temporarily bring about a reducing atmosphere (a rich atmosphere), thereby purifying the absorbed NOx (Patent Literature 1). Furthermore, as a technology to make up for the disadvantage of the method for absorbing and treating NOx, a method is proposed, including placing a catalyst for oxidizing HC and CO at the upstream side of an exhaust gas flow, and providing a NOx purification catalyst at the downstream side thereof (Patent Literature 2). In addition, a technology to effectively utilize hydrogen ($H_2$) included in an exhaust gas is disclosed, including selectively purifying HC and CO at the upstream side of an exhaust gas flow, and purifying NOx with the use of the remained $H_2$ at the downstream side thereof. Moreover, a technology is proposed, including actively introducing a reductant such as ammonia into an exhaust gas, thereby purifying NOx (Patent Literature 3). In addition, an exhaust gas purification catalyst is disclosed, having high NOx purification performance in the operation range, in particular under low temperature condition (Patent Literature 4). In addition, an exhaust gas purification catalyst having high NOx purification performance is disclosed, in which ceria (cerium oxide (IV); $CeO_2$) having a NOx adsorption capacity is combined with zeolite having an HC adsorption capacity (Patent Literature 5). In addition, an exhaust gas purification catalyst having three coated layers is disclosed, the outermost layer of which is provided with a layer composed of ceria alone to suppress poisoning by SOx (Patent Literature 6).

PRIOR ART TECHNOLOGY LITERATURES

Patent Literatures

Patent Literature 1: JP 2001-248471 A
Patent Literature 2: JP 2001-123827 A
Patent Literature 3: JP 2006-326437 A
Patent Literature 4: JP 2009-22821 A (US 2010/0204036 A1)
Patent Literature 5: JP 2001-219070 A
Patent Literature 6: JP 11-156159 A (EP 0905354 A2)

SUMMARY OF INVENTION

Problem to be Solved by the Invention

However, in recent years, higher NOx purification efficiency is further required.

Accordingly, the present invention has an object to provide an exhaust gas purification catalyst for a lean burn engine having sufficient NOx purification performance.

Means for Solving the Problem

Surprisingly, as a result of zealous studies promoted by the inventors for solving the above-mentioned problem, it has been found that the NOx purification efficiency significantly improves when the same catalyst layer supports a larger amount of ceria together with noble metal in comparison with a conventional exhaust gas purification catalyst, and thus the present invention is completed.

That is, the exhaust gas purification catalyst for a lean burn engine according to the present invention has a catalyst component including noble metal and ceria supported on a three-dimensional structure. In the whole catalyst, the supported amount of ceria per 1 L (liter) of catalyst is 140 to 300 g/L, and in the whole catalyst, the proportion of ceria is 50 to 98% by mass with respect to the whole coated amount. Furthermore, it is characterized that 50% by mass or more of ceria is included in the same catalyst layer in which noble metal is included, and the amount of noble metal included in the catalyst layer is 0.1% by mass or more with respect to the amount of ceria included in the catalyst layer.

Effect of the Invention

According to the present invention, it is possible to provide an exhaust gas purification catalyst for a lean burn engine having sufficient NOx purification performance.

MODES FOR CARRYING OUT THE INVENTION

Hereinafter, a description is made of embodiments of the present invention, but the present invention is not limited to only the following embodiments. Note that in this description, "an exhaust gas purification catalyst for a lean burn engine" is also called simply "a catalyst". In addition, "A to B" in this description means "A or more to B or less", and "C and/or D" means either or both of C and D. In addition, in this description, the "mass" and "weight" are used as the synonym. Various physical properties included in this description mean a value measured by a method disclosed in Examples as mentioned below, unless otherwise specified.

<Exhaust Gas Purification Catalyst>

An exhaust gas purification catalyst for a lean burn engine according to one embodiment of the present invention has a catalyst component including noble metal and ceria supported on a three-dimensional structure. In the whole catalyst, the supported amount of ceria per 1 L of catalyst is 140 to 300 g/L, and in the whole catalyst, the proportion of ceria is 50 to 98% by mass with respect to the whole coated amount. Furthermore, it is characterized that 50% by mass or more of ceria is included in the same catalyst layer in which noble metal is included, and the amount of noble metal included in the catalyst layer is 0.1% by mass or more with respect to the amount of ceria included in the catalyst layer. The exhaust gas purification catalyst for a lean burn engine of the present invention having such a composition has excellent NOx purification performance. In particular, the catalyst of the present invention can exhibit high NOx purification performance even in a lean atmosphere such as in a diesel engine or a gasoline lean burn engine, in an exhaust gas in high temperature range or low temperature range, and in high space velocity (high SV) condition, in which conventional catalysts cannot exhibit sufficient NOx purification performance. Although the reason why the exhaust gas purification catalyst for a lean burn engine of the present invention exhibits the above-mentioned effect in this way is unclear, the inventors suppose that this is based on the mechanism as mentioned below. Note that the present invention is not limited by the mechanism as mentioned below.

That is, the catalyst of the present invention is characterized in that the same catalyst layer supports a large amount of ceria together with noble metal. Taking such a composition, it is considered that high boiling point hydrocarbon having a long carbon chain included in an exhaust gas and oxygen belonging to ceria itself are decomposed (partially oxidized) to olefin having a shorter carbon chain and the like by the noble metal as a catalyst. It is supposed that, because the olefin having a shorter carbon chain functions as a reductant in a NOx reduction reaction, the NOx purification performance improves. Therefore, it becomes possible to exhibit excellent NOx purification performance even in a lean atmosphere such as in a diesel engine or a gasoline lean burn engine, in an exhaust gas in high temperature range or low temperature range, and in high space velocity (high SV) condition, in which conventional catalysts cannot exhibit sufficient NOx purification performance. Hereinafter, a detailed description is made of the exhaust gas purification catalyst for a lean burn engine of the present invention for each component.

[Catalyst Component]

It is necessary for the exhaust gas purification catalyst for a lean burn engine of the present invention to include noble metal and ceria as a catalyst component. Furthermore, it is possible to include a promoter and/or refractory inorganic oxide if necessary.

(Noble Metal)

In the present invention, noble metal functions as a catalyst for an oxidation or reduction reaction of each component included in an exhaust gas. The kind of noble metal in the present invention is not limited in particular, and thus noble metal elements usable in this technical field may be appropriately adopted, such as platinum (Pt), palladium (Pd), rhodium (Rh), iridium (Ir), and ruthenium (Ru). Among them, it is preferable to include at least one kind of platinum, palladium, rhodium and iridium, and more preferable to include at least one kind of platinum, palladium and rhodium. Containing these noble metals, it is possible to cause the oxidation or reduction reaction. Note that these kinds of noble metal may be used alone or in combination of two or more kinds.

When platinum is included as the noble metal, the contained amount of platinum per 1 L of catalyst is preferably 0.05 to 15 g/L, more preferably 0.1 to 10 g/L. When 0.05 g/L or more of platinum is added, the exhaust gas purification rate improves as platinum increases, but when platinum increases beyond 15 g/L, NOx purification efficiencies according to the increment are not provided, leading to drop in the cost performance.

The platinum (Pt) source as a starting material is not limited in particular, and thus materials used in the exhaust gas purification field may be used. Specifically included are halide, inorganic salt, carboxylate, hydroxide, alkoxide, oxide and the like. Among them, nitrate, dinitrodiammine salt, chloride, tetraammine salt, bis-ethanolamine salt, and bis-acetylacetonate are preferable. More preferably, nitrate, tetraammine salt, dinitrodiammine salt, and bis-ethanolamine salt are included. Note that in the present invention, the above-mentioned platinum sources may be used alone or in combination of two or more kinds.

When palladium is included as the noble metal, the contained amount of palladium per 1 L of catalyst is preferably 0.05 to 15 g, more preferably 0.1 to 10 g. When 0.05 g/L or more of palladium is added, the exhaust gas purification rate improves as palladium increases, but when palladium increases beyond 15 g/L, NOx purification efficiencies according to the increment are not provided, leading to drop in the cost performance.

The palladium (Pd) source as a starting material is not limited in particular, and thus materials used in the exhaust gas purification field may be used. Specifically included are halide, inorganic salt, carboxylate, hydroxide, alkoxide, oxide and the like. Preferably, nitrate, acetate, ammonium salt, amine salt, tetraammine salt, and carbonate are included. Among them, nitrate, chloride, acetate, and tetraammine salt are preferable, and palladium nitrate is more preferable. Note that the above-mentioned palladium sources may be used alone or in combination of two or more kinds.

When rhodium is included as the noble metal, the contained amount of rhodium per 1 L of catalyst is preferably 0.05 to 15 g, more preferably 0.1 to 10 g. When the amount of rhodium is within the above-mentioned range, it is possible to exhibit sufficient catalyst performance. When 0.05 g/L or more of rhodium is added, the exhaust gas purification rate improves as rhodium increases, but when rhodium increases beyond 15 g/L, NOx purification efficiencies according to the increment are not provided, leading to drop in the cost performance.

The rhodium (Rh) source as a starting material is not limited in particular, and thus materials used in the exhaust gas purification field may be used. Specifically included are halide, inorganic salt, carboxylate, hydroxide, alkoxide, oxide and the like. Preferably, nitrate, ammonium salt, amine salt, and carbonate are included. Among them, nitrate, chloride, acetate, and hexaammine salt are preferable, and rhodium nitrate is more preferable. Note that the above-mentioned rhodium sources may be used alone or in combination of two or more kinds.

The supported form of the noble metal is not limited in particular, but from the viewpoint of promotion of the oxidation or reduction reaction, it is preferable that the noble metal be supported on the refractory inorganic oxide or ceria as mentioned below, and it is more preferable that the noble metal be supported on the refractory inorganic oxide. When two or more kinds of noble metal are used in combination, all or part of the two or more kinds of noble metal may be supported on the same refractory inorganic oxide or ceria, or each thereof may be supported on different refractory inorganic oxide or ceria.

Methods for supporting noble metal on refractory inorganic oxide or ceria are not limited in particular, and thus supporting methods used in this technical field may be appropriately adopted. Specifically included are (1) a method including mixing refractory inorganic oxide or ceria with an aqueous solution of noble metal, and drying and calcining a mixture; (2) a method including mixing refractory inorganic oxide or ceria with an aqueous solution of noble metal, and then adding a reductant to reduce noble metal ions thereby depositing and attaching the noble metal to the refractory inorganic oxide or ceria; (3) a method including mixing refractory inorganic oxide or ceria with an aqueous solution of noble metal, and then heating a mixture to cause the noble metal to be adsorbed to the refractory inorganic oxide or ceria, and the like.

(Ceria)

In the present invention, ceria (cerium oxide (IV); $CeO_2$) mainly functions as a NOx absorbent (adsorbent). In addition, as mentioned above, ceria included in the same catalyst layer in which noble metal is included is considered to contribute decomposition (partial oxidation) of hydrocarbon having a long carbon chain in an exhaust gas to hydrocarbon having a shorter carbon chain.

The catalyst of the present invention has a supported amount of ceria per 1 L of catalyst of necessarily 140 to 300 g/L, preferably 175 to 275 g/L, more preferably 190 to 230 g/L. In addition, the supported amount of ceria is necessarily 50 to 98% by mass, preferably 50 to 75% by mass, more preferably 59 to 75% by mass with respect to the whole coated amount. When the supported amount of ceria per 1 L of catalyst is below 140 g/L, or the supported amount of ceria is below 50% by mass with respect to the whole coated amount, the NOx absorption (adsorption) function of ceria may not be sufficiently exhibited. On the other hand, when the supported amount of ceria per 1 L of catalyst is beyond 300 g/L, or the supported amount of ceria is beyond 98% by mass with respect to the whole coated amount, the mechanical strength of the catalyst layer may remarkably decrease.

In the present invention, the material of ceria ($CeO_2$ source) is not limited in particular, and thus materials used in this technical field may be appropriately adopted. Specifically, solid ceria (ceria powder) or cerium salt may be used. Cerium salt specifically includes nitrate such as cerous nitrate, carbonate, sulfate and the like. Among them, nitrate is preferably used. Note that the above-mentioned $CeO_2$ sources may be used alone or in combination of two or more kinds.

(Promoter)

It is preferable that the catalyst of the present invention include a promoter in addition to the above-mentioned noble metal and ceria as a catalyst component. The promoter is not limited in particular, but preferably includes at least one element selected from the group consisting of alkali metal, alkaline earth metal, rare earth (except cerium), and magnesium.

Examples of alkali metal include sodium, potassium, rubidium, and cesium. Examples of alkaline earth metal include strontium and barium. Rare earth (except cerium) includes rare earth elements selected from the group consisting of lanthanum, praseodymium, neodymium, samarium, europium, gadolinium, terbium, dysprosium, holmium, erbium and the like. Among them, from the viewpoint of NOx absorption (adsorption) property, sodium, potassium, barium, strontium, lanthanum and magnesium are preferably included, and potassium, barium and strontium are more preferably included. These promoters may be used alone or in combination of two or more kinds. These elements may be used in the form of oxide, carbonate, sulfate or the like, preferably oxide or carbonate.

The contained amount of promoter per 1 L of catalyst is also not limited in particular, but is usually 0 to 150 g/L, preferably 5 to 100 g/L, more preferably 5 to 50 g/L.

(Refractory Inorganic Oxide)

It is preferable that the catalyst of the present invention include at least one kind of refractory inorganic oxide in addition to the above-mentioned noble metal and ceria as a catalyst component. Supporting fine particles such as the above-mentioned noble metal on the surface of the refractory inorganic oxide enables to provide the surface area of the noble metal, thereby effectively exhibiting the performance as a catalyst. The refractory inorganic oxide used in the present invention is not limited in particular, and thus those used in this technical fieldmaybe appropriately adopted. Examples thereof include single oxide such as α-alumina ($Al_2O_3$), γ-alumina, δ-alumina, η-alumina, θ-alumina, titania ($TiO_2$), zirconia ($ZrO_2$), lanthana ($La_2O_3$) and silica ($SiO_2$), and composite oxide thereof such as alumina-titania, alumina-zirconia, alumina-lanthana, titania-zirconia, zeolite (alumina silicate) and silica-alumina. Preferably, single oxide such as γ-alumina, titania, zirconia, lanthana and silica, and composite oxide thereof are used. In addition, refractory inorganic oxide may be one which some of metal elements stabilized with a rare earth element, or may form composite oxide with the above-mentioned ceria. The above-mentioned refractory inorganic oxide may be used alone or in the form of a mixture of two or more kinds.

The average particle diameter of refractory inorganic oxide is not limited in particular, but is usually 2.0 to 60 μm, preferably 5.0 to 50 μm, more preferably 5.0 to 40 μm. Note that in this description, "the average particle diameter" is obtained by calculating the mean value of the particle diameters of refractory inorganic oxide powder measured by a publicly known method such as a laser diffractometry or a dynamic light scattering method. In addition, the BET specific surface area of refractory inorganic oxide is also not limited in particular, but is preferably 50 to 750 m$^2$/g, more preferably 150 to 750 m$^2$/g. By using such refractory inorganic oxide, it is possible to sufficiently support the catalyst component (e.g., noble metal).

The supported amount of refractory inorganic oxide in the catalyst of the present invention preferably per 1 L of catalyst is not limited in particular, but is preferably 1 to 299 g/L, more preferably 57 to 274 g/L, still more preferably 62 to 165 g. Because when the supported amount of refractory inorganic oxide is 1 g/L or more, it is possible to sufficiently disperse the catalyst component (e.g., noble metal), and sintering of the noble metal is inhibited, the durability of catalyst may improve. On the other hand, when the supported amount is 299 g/L or less, the thickness of the catalyst layer does not become too thick, and the contacting state of the noble metal with an exhaust gas becomes good, so that it is possible to prevent the pressure loss from becoming larger and the mechanical strength of the catalyst layer from being decreased, while sufficiently exhibiting the catalyst performance.

Note that the catalyst of the present invention has a total amount of the above-mentioned catalyst component per 1 L of catalyst of preferably 143 to 600 g/L, more preferably 233 to 550 g/L, still more preferably 253 to 396 g/L. Within such ranges, the catalyst of the present invention may exhibit sufficient function by each of the above-mentioned catalyst components.

[Three-Dimensional Structure]

The above-mentioned catalyst component of the catalyst of the present invention is supported on a three-dimensional structure. In other words, the catalyst of the present invention has a structure such that the surface of the three-dimensional structure is coated with the above-mentioned catalyst component. The three-dimensional structure used in the present invention is not limited in particular, and thus those used generally in the exhaust gas purification catalyst field may be appropriately adopted, but preferably a three-dimensional integrated structure (a monolith carrier) composed of a refractory material is used. Examples thereof include a monolith honeycomb carrier, a metal honeycomb carrier, a plug honeycomb carrier and the like.

Specifically, a honeycomb carrier, in particular composed of a ceramic material such as cordierite, mullite, α-alumina, zirconia, titania, titanium phosphate, aluminum titanate, petalite, spodumene, aluminosilicate, magnesium silicate, is preferable, and among them, a cordierite one is particularly preferable. In addition, a three-dimensionally structured refractory one with the use of oxidation-resistant and heat-resistant metal such as stainless steel or an Fe—Cr—Al alloy is also used.

These monolith carriers, in which a wall flow type and a flow through type are included, are produce by a method such as an extrusion molding method or a method in which a sheet-like element is rolled up and fixed. The shape of gas-passing-through opening thereof (cell shape) may be any one of hexagon, quadrangle, triangle or corrugation shape. Cell density (the number of cells/unit cross sectional area) of 100 to 900 cells/square inch is sufficiently usable, preferably 200 to 600 cells/square inch.

In addition, the catalyst of the present invention may have only one catalyst layer formed on the three-dimensional structure, or two or more catalyst layers formed thereon, but preferably has two or more catalyst layers formed thereon. In other words, it is characterized that the catalyst according to one preferable embodiment of the present invention has a first catalyst layer and a second catalyst layer sequentially laminated on the three-dimensional structure, at least one of the above-mentioned first catalyst layer and the above-mentioned second catalyst layer including the above-mentioned catalyst component. When two or more catalyst layers are provided on the three-dimensional structure, it is possible for each of the catalyst layers to support a different catalyst component, and thus have a different function. Accordingly, it is possible for the whole catalyst to further improve the exhaust gas purifying performance.

When two or more catalyst layers are included, it is preferable that, as to the ceria included in the catalyst of the present invention, a specific amount or more thereof be included in the same catalyst layer in which the above-mentioned noble metal is included. Specifically, with respect to a total amount of ceria included in the catalyst, preferably 50% by mass or more, more preferably 55% by mass or more, still more preferably 60% by mass or more is included in the same catalyst layer in which noble metal is included. In addition, the amount of noble metal included in the catalyst layer is preferably 0.1 to 30% by mass, more preferably 0.2 to 25% by mass, still more preferably 0.4 to 20% by mass, with respect to the amount of ceria included in the concerned catalyst layer. Because the predetermined amount (proportion) of ceria and noble metal is included in the same catalyst layer in this way, a reaction of decomposition (partial oxidation) of high boiling point hydrocarbon having a long carbon chain mainly included in light oil and the like in an exhaust gas to olefin having a shorter carbon chain and the like may be further promoted as mentioned above. In this way, it is considered that the amount of olefin having a shorter carbon chain and the like functioning as a reductant in the NOx reduction reaction increases, which makes it possible to exhibit more excellent NOx purification performance.

<Method for Producing Exhaust Gas Purification Catalyst for Lean Burn Engine>

A method for producing the exhaust gas purification catalyst for a lean burn engine of the present invention is not limited in particular, and thus publicly known approaches may be appropriately referred, as long as they are producing methods including supporting the above-mentioned catalyst component on the above-mentioned three-dimensional structure. Specifically, the catalyst may be produced by the following method.

(1) a method for producing a catalyst, including putting a solid ceria powder or cerium salt, a promoter component, noble metal salt, and refractory inorganic oxide into a solvent to form a slurry with the use of a wet grinding mill such as a ball mill, soaking a three-dimensional structure in the slurry, and removing the excess slurry, followed by drying and calcining, (2) a method for producing a catalyst, including putting a solid ceria powder or cerium salt, a promoter component, and refractory inorganic oxide on which noble metal is supported into a solvent to form a slurry with the use of a wet grinding mill such as a ball mill, soaking a three-dimensional structure in the slurry, and removing the excess slurry, followed by drying and calcining, (3) a method for producing a catalyst, including putting a solid ceria powder or cerium salt and refractory inorganic oxide into a solvent to form a slurry with the use of a wet grinding mill such as a ball mill, soaking a three-dimensional structure in the slurry, removing the excess slurry, followed by drying and calcining, soaking the dried and calcined structure in an aqueous solution including water-soluble noble metal salt and water-soluble promoter component salt, and then removing a excess liquid, followed by drying and calcining, (4) a method for producing a catalyst, including putting a solid ceria powder or cerium salt, a promoter component, and refractory inorganic oxide into a solvent to form a slurry with the use of a wet grinding mill such as a ball mill, soaking a three-dimensional structure in the slurry, removing the excess slurry, followed by drying and calcining, soaking the dried and calcined structure in an aqueous solution including noble metal salt, and removing a excess liquid, followed by drying and calcining, (5) a method for producing a catalyst, including putting a promoter component and refractory inorganic oxide on which noble metal is supported into a solvent to form a slurry with the use of a wet grinding mill such as a ball mill, soaking a three-dimensional structure in the slurry, removing the excess slurry, followed by drying or calcining, soaking the dried and calcined structure in an aqueous solution including ceria or water-soluble cerium salt, and removing a excess liquid, followed by drying and calcining, (6) a method for producing a catalyst, including putting a solid ceria powder or cerium salt on which noble metal is supported, a promoter component, and refractory inorganic oxide into a solvent to form a slurry with the use of a wet grinding mill such as a ball mill, soaking a three-dimensional structure in the slurry, and removing the excess slurry, followed by drying and calcining, and the like.

Note that a method for producing a catalyst in which two or more catalyst layers are formed is also not limited in particular, and thus publicly known conventional approaches may be appropriately referred, as long as they are producing methods including the steps of forming the above-mentioned first catalyst layer on the above-mentioned three-dimensional structure, and forming the above-mentioned second catalyst layer on the above-mentioned first catalyst layer. Specifically, the lower (first) catalyst layer is formed by any of above-mentioned (1) to (6), and then the operation in (1) to (6) is appropriately repeated to form the second or higher catalyst layers, such that a completed catalyst may be produced.

In the above-mentioned method, the solvent for use in preparation of the slurry is not limited in particular, and thus those used in this technical field may be appropriately adopted. In this case, the concentration of the catalyst component in the solvent is not limited in particular, as long as the desired amount is an amount to be supported on the three-dimensional structure. The concentration of the catalyst component in the solvent is an amount of preferably 20 to 60% by mass, more preferably 25 to 50% by mass. In addition, it is preferable to mix the catalytic component in a solvent and then wet-grind the mixture, in which the wet grinding method is not limited in particular, but is usually carried out according to a publicly known method. For example, the wet grinding is carried out with the use of a ball mill or the like. The drying or calcining condition after the coating on the three-dimensional structure is not limited in particular, and thus conditions used in this technical field may be appropriately adopted.

<Method for Purifying Exhaust Gas>

As mentioned above, the exhaust gas purification catalyst for a lean burn engine of the present invention may exhibit so high NOx purification performance that the catalyst is suitable for purification of exhaust gas from a lean burn internal combustion engine and the like. That is, according to another embodiment of the present invention, a method for purifying an exhaust gas is provided, including bringing an exhaust gas purification catalyst for a lean burn engine into contact with an exhaust gas from a lean burn engine.

In case of treating an exhaust gas with the use of the catalyst according to the present invention, a targeted exhaust gas is an exhaust gas from an internal combustion engine such as a diesel engine or a gasoline lean burn engine. Particularly, excellent effect is exhibited when a reductant is regularly introduced into an exhaust gas in an oxidative atmosphere (lean). In addition, when the catalyst according to the present invention is attached at the downstream side of an engine, it is possible to purify NOx, while repeating a operation that a reductant, preferably a fuel, is injected to an exhaust gas in an oxidative atmosphere (lean). The injection method may be cylinder injection or exhaust pipe injection. Here, the molar ratio (HC/NOx) of HC (methane conversion) to NOx included in an exhaust gas at the time when a reductant (fuel) is injected is preferably from 1 to 50, more preferably from 2 to 25.

Note that the catalyst of the present invention has a feature capable of exhibiting sufficient NOx purification performance even in a lean atmosphere, as mentioned above. Accordingly, the catalyst of the present invention is particularly suitable for use in purification of an exhaust gas from a lean burn engine.

The space velocity (SV) of an exhaust gas may be a normal velocity, but when the velocity is under high SV condition of particularly 20,000 to 300,000 $h^{-1}$, preferably 30,000 to 200,000 $h^{-1}$, it is possible to efficiently purify NOx.

The exhaust gas temperature (the catalyst inlet temperature) may be around 100° C. to 1000° C., preferably 150° C. to 700° C. Particularly when the exhaust gas temperature is low temperature (in low temperature range), it is possible to efficiently purify NOx from 100 to 300° C., more preferably from 150 to 250° C. In addition, when the exhaust gas temperature is high temperature, it is possible to efficiently purify NOx from 350 to 800° C., more preferably from 400 to 700° C.

More specifically, under the following condition: (condition 1) the catalyst inlet temperature is 150 to 250° C., and the space velocity (SV) is 30,000 to 100,000 $h^{-1}$; (condition 2) the catalyst inlet temperature is 250 to 700° C., and the space velocity (SV) is 30,000 to 200,000 $h^{-1}$; or (condition 3) the catalyst inlet temperature is 400 to 700° C., and the space velocity (SV) is 100,000 to 200,000 $h^{-1}$, it is possible to more efficiently purify NOx.

The catalyst of the present invention may be used under an operating condition including any one of the above-mentioned exhaust gas conditions 1 to 3 comprising the catalyst inlet temperature and the space velocity (SV) of an exhaust gas, or may be used under operating conditions combining two or more of these conditions 1 to 3 (in other words, conditions 1 and 2; conditions 1 and 3; conditions 2 and 3; or conditions 1, 2 and 3).

The exhaust gas purification catalyst for a lean burn engine of the present invention may be provided in an exhaust gas passage in order to treat an exhaust gas, which catalyst may be provided from near the downstream of an engine manifold to under the floor of cars. Furthermore, it is also possible to use a catalyst having another function in combination. Examples thereof are an HC trap catalyst or adsorbent having a hydrocarbon adsorption function, a diesel particulate filter (DPF), a three-way catalyst or oxidation catalyst (DOC), and a selective NOx reduction catalyst (SCR). A preferable condition for use in combination is a system in which the exhaust gas purification catalyst of the present invention is provided at the upstream side of an exhaust gas, and the diesel particulate filter (DPF) or the selective NOx reduction catalyst (SCR) is provided at the downstream side.

EXAMPLES

A description is made of the effect of the present invention with reference to the following Examples and Comparative Examples. However, the technical scope of the present invention is not limited to the following Examples only.

Example 1

Appropriate amounts of alumina-lanthana composite oxide (average particle diameter of 35 μm, BET specific surface area of approximately 135 m$^2$/g), barium carbonate, ceria, palladium nitrate, rhodium nitrate, bis-ethanolamine platinum solution and water were mixed to prepare an aqueous slurry. A commercial cordierite monolith honeycomb carrier (400 cells/square inch, 103 mm in diameter, 130 mm in length, 1.083 L in volume) was immersed in the aqueous slurry, and the excess slurry was blown off with compressed air. Then, the immersed carrier was dried at 150° C. for 20 minutes until there was no reduction of moisture, and further calcined at 500° C. for 1 hour in an electric furnace to prepare a completed catalyst (A).

In the catalyst (A), 2.7 g/L of platinum, 0.6 g/L of palladium, 0.2 g/L of rhodium, 18 g/L of barium carbonate, 144 g/L of alumina-lanthana composite oxide, 198.3 g/L of ceria were supported on the carrier, and the proportion of ceria to the whole coated amount was 54.5% by mass.

Example 2

Appropriate amounts of alumina-lanthana composite oxide (average particle diameter of 35 μm, BET specific surface area of approximately 135 m$^2$/g), barium carbonate, ceria, palladium nitrate, rhodium nitrate, bis-ethanolamine platinum solution and water were mixed to prepare an aqueous slurry. A commercial cordierite monolith honeycomb carrier (400 cells/square inch, 103 mm in diameter, 130 mm in length, 1.083 L in volume) was immersed in the aqueous slurry, and the excess slurry was blown off with compressed air. Then, the immersed carrier was dried at 150° C. for 20 minutes until there was no reduction of moisture, and further calcined at 500° C. for 1 hour in an electric furnace to prepare a completed catalyst (B).

In the catalyst (B), 2.7 g/L of platinum, 0.6 g/L of palladium, 0.2 g/L of rhodium, 18 g/L of barium carbonate, 139 g/L of alumina-lanthana composite oxide, 203.0 g/L of ceria were supported on the carrier, and the proportion of ceria to the whole coated amount was 55.8% by mass.

Example 3

Appropriate amounts of alumina-lanthana composite oxide (average particle diameter of 35 μm, BET specific surface area of approximately 135 m$^2$/g), barium carbonate, ceria, palladium nitrate, rhodium nitrate, bis-ethanolamine platinum solution and water were mixed to prepare an aqueous slurry. A commercial cordierite monolith honeycomb carrier (400 cells/square inch, 103 mm in diameter, 130 mm in length, 1.083 L in volume) was immersed in the aqueous slurry, and the excess slurry was blown off with compressed air. Then, the immersed carrier was dried at 150° C. for 20 minutes until there was no reduction of moisture, and further calcined at 500° C. for 1 hour in an electric furnace to prepare a completed catalyst (C).

In the catalyst (C), 2.7 g/L of platinum, 0.6 g/L of palladium, 0.2 g/L of rhodium, 18 g/L of barium carbonate, 110 g/L of alumina-lanthana composite oxide, 232.0 g/L of ceria were supported on the carrier, and the proportion of ceria to the whole coated amount was 63.8% by mass.

Example 4

Appropriate amounts of alumina-lanthana composite oxide (average particle diameter of 35 μm, BET specific surface area of 135 m$^2$/g), barium carbonate, ceria, palladium nitrate, bis-ethanolamine platinum solution and water were mixed to prepare an aqueous slurry. A commercial cordierite monolith honeycomb carrier (400 cells/square inch, 103 mm in diameter, 130 mm in length, 1.083 L in volume) was immersed in the aqueous slurry, and the excess slurry was blown off with compressed air. Then, the immersed carrier was dried at 150° C. for 20 minutes until there was no reduction of moisture, and further calcined at 500° C. for 1 hour in an electric furnace to prepare an inner layer-coated carrier.

Furthermore, appropriate amounts of alumina-lanthana composite oxide (average particle diameter of 35 μm, BET specific surface area of 135 m$^2$/g), palladium nitrate, rhodium nitrate, bis-ethanolamine platinum solution, barium carbonate, ceria and water were mixed to prepare an aqueous slurry. The inner layer-coated carrier was immersed in the aqueous slurry, and the excess slurry was blown off with compressed air. Then, the immersed carrier was dried at 150° C. for 20 minutes until there was no reduction of moisture, and further calcined at 500° C. for 1 hour in an electric furnace to prepare a completed catalyst having an outer layer (outermost surface layer) coat (D).

In the catalyst (D) having two catalyst layers, 2.7 g/L of platinum, 0.6 g/L of palladium, 0.2 g/L of rhodium, 18 g/L of barium carbonate, 120 g/L of alumina-lanthana composite oxide, 222.0 g/L of ceria were supported on the carrier, and the proportion of ceria to the whole coated amount was 61.1% by mass. In addition, in the inner layer (first catalyst layer), 1.35 g/L of platinum, 0.15 g/L of palladium, 12.2 g/L of barium carbonate, 93.8 g/L of alumina-lanthana composite oxide, 174 g/L of ceria were supported, and the ratio of the amount of ceria in the inner layer to the inner layer-coated amount was 61.8% by mass. In the surface layer (second catalyst layer), 1.35 g/L of platinum, 0.45 g/L of palladium, 0.2 g/L of rhodium, 5.8 g/L of barium carbonate, 26.2 g/L of alumina-lanthana composite oxide, 48 g/L of ceria were supported.

Example 5

Appropriate amounts of alumina-lanthana composite oxide (average particle diameter of 35 μm, BET specific surface area of 135 m$^2$/g), barium carbonate, ceria, palladium nitrate, bis-ethanolamine platinum solution and water were mixed to prepare an aqueous slurry. A commercial cordierite monolith honeycomb carrier (400 cells/square inch, 143.8 mm in diameter, 100 mm in length, 1.624 L in volume) was immersed in the aqueous slurry, and the excess slurry was blown off with compressed air. Then, the immersed carrier was dried at 150° C. for 20 minutes until there was no reduction of moisture, and further calcined at 500° C. for 1 hour in an electric furnace to prepare an inner layer-coated carrier.

Furthermore, appropriate amounts of alumina-lanthana composite oxide (average particle diameter of 35 μm, BET specific surface area of 135 m$^2$/g), palladium nitrate, rhodium nitrate, bis-ethanolamine platinum solution, barium carbonate, ceria and water were mixed to prepare an aqueous slurry. The inner layer-coated carrier was immersed in the aqueous slurry, and the excess slurry was blown off with compressed air. Then, the immersed carrier was dried at 150° C. for 20 minutes until there was no reduction of moisture, and further calcined at 500° C. for 1 hour in an electric furnace to prepare a completed catalyst having an outer layer (outermost surface layer) coat (E).

In the catalyst (E) having two catalyst layers, 2.7 g/L of platinum, 0.6 g/L of palladium, 0.2 g/L of rhodium, 32.5 g/L of barium carbonate, 99.8 g/L of alumina-lanthana composite oxide, 233 g/L of ceria were supported on the carrier, and the proportion of ceria to the whole coated amount was 63.2% by mass. In addition, in the inner layer (first catalyst layer), 1.35 g/L of platinum, 0.3 g/L of palladium, 0.2 g/L of rhodium, 26.7 g/L of barium carbonate, 72.35 g/L of alumina-lanthana composite oxide, 190 g/L of ceria were supported, and the ratio of the amount of ceria in the inner layer to the inner layer-coated amount was 65.3% by mass.

In the surface layer (second catalyst layer), 1.35 g/L of platinum, 0.3 g/L of palladium, 5.8 g/L of barium carbonate, 27.45 g/L of alumina-lanthana composite oxide, 43 g/L of ceria were supported.

Comparative Example 1

Appropriate amounts of alumina-lanthana composite oxide, barium carbonate, ceria, palladium nitrate, rhodium nitrate, bis-ethanolamine platinum solution and water were mixed to prepare an aqueous slurry. A commercial cordierite monolith honeycomb carrier (400 cells/square inch, 103 mm in diameter, 130 mm in length, 1.083 L in volume) was immersed in the aqueous slurry, and the excess slurry was blown off with compressed air. Then, the immersed carrier was dried at 150° C. for 20 minutes until there was no reduction of moisture, and further calcined at 500° C. for 1 hour in an electric furnace to prepare a completed catalyst (F).

In the catalyst (F), 2.7 g/L of platinum, 0.6 g/L of palladium, 0.2 g/L of rhodium, 17 g/L of barium carbonate, 196 g/L of alumina-lanthana composite oxide, 146.7 g/L of ceria were supported on the carrier, and the proportion of ceria to the whole coated amount was 40.4% by mass.

Comparative Example 2

Appropriate amounts of alumina-lanthana composite oxide, barium carbonate, ceria, palladium nitrate, rhodium nitrate, bis-ethanolamine platinum solution and water were mixed to prepare an aqueous slurry. A commercial cordierite monolith honeycomb carrier (400 cells/square inch, 103 mm in diameter, 130 mm in length, 1.083 L in volume) was immersed in the aqueous slurry, and the excess slurry was blown off with compressed air. Then, the immersed carrier was dried at 150° C. for 20 minutes until there was no reduction of moisture, and further calcined at 500° C. for 1 hour in an electric furnace to prepare a completed catalyst (G).

In the catalyst (G), 2.7 g/L of platinum, 0.6 g/L of palladium, 0.2 g/L of rhodium, 22 g/L of barium carbonate, 255 g/L of alumina-lanthana composite oxide, 83.3 g/L of ceria were supported on the carrier, and the proportion of ceria to the whole coated amount was 22.9% by mass.

Comparative Example 3

Appropriate amounts of alumina-lanthana composite oxide (average particle diameter of 35 μm, BET specific surface area of 135 m²/g), barium carbonate, ceria, palladium nitrate, bis-ethanolamine platinum solution and water were mixed to prepare an aqueous slurry. A commercial cordierite monolith honeycomb carrier (400 cells/square inch, 143.8 mm in diameter, 100 mm in length, 1.624 L in volume) was immersed in the aqueous slurry, and the excess slurry was blown off with compressed air. Then, the immersed carrier was dried at 150° C. for 20 minutes until there was no reduction of moisture, and further calcined at 500° C. for 1 hour in an electric furnace to prepare an inner layer-coated carrier.

Furthermore, appropriate amounts of alumina-lanthana composite oxide (average particle diameter of 35 μm, BET specific surface area of 135 m²/g), palladium nitrate, rhodium nitrate, bis-ethanolamine platinum solution, barium carbonate, ceria and water were mixed to prepare an aqueous slurry. The inner layer-coated carrier was immersed in the aqueous slurry, and the excess slurry was blown off with compressed air. Then, the immersed carrier was dried at 150° C. for 20 minutes until there was no reduction of moisture, and further calcined at 500° C. for 1 hour in an electric furnace to prepare a completed catalyst having an outer layer (outermost surface layer) coat (H).

In the catalyst (H) having two catalyst layers, 2.7 g/L of platinum, 0.6 g/L of palladium, 0.2 g/L of rhodium, 32.5 g/L of barium carbonate, 150 g/L of alumina-lanthana composite oxide, 182.9 g/L of ceria were supported on the carrier, and the proportion of ceria to the whole coated amount was 49.6% by mass. In addition, in the inner layer (first catalyst layer), 1.35 g/L of platinum, 0.15 g/L of palladium, 0.2 g/L of rhodium, 26.7 g/L of barium carbonate, 108.9 g/L of alumina-lanthana composite oxide, 153.7 g/L of ceria were supported, and the ratio of the amount of ceria in the inner layer to the inner layer-coated amount was 52.8% by mass. In the surface layer (second catalyst layer), 1.35 g/L of platinum, 0.45 g/L of palladium, 5.8 g/L of barium carbonate, 41.1 g/L of alumina-lanthana composite oxide, 29.2 g/L of ceria were supported.

(Result of NOx Reduction Evaluation)

The above-mentioned completed catalysts (A) to (E) prepared in Examples 1 to 5 and the completed catalysts (F) to (H) prepared in Comparative Examples 1 to 3 were tested as follows.

The mean NOx purification rate (%) was measured in a state where each of the completed catalysts was attached at the engine downstream side of a diesel engine bench, in which an operation for regularly injecting light oil into an exhaust gas at the upstream side of the catalyst was repeated in a steady-state oxidative atmosphere (lean). The NOx purification rate was calculated by the following formula.

$$NOx \text{ purification rate } (\%) = \frac{\text{Engine outlet } NOx \text{ concentration } (ppm) - \text{Catalyst outlet } NOx \text{ concentration } (ppm)}{\text{Engine outlet } NOx \text{ concentration } (ppm)} \cdot 100 \quad \text{[Equation 1]}$$

In addition, the exhaust gas composition under the steady operation in each experimental condition and the HC (methane conversion)/NOx ratio at the time of light oil injection is indicated below.

TABLE 1

| | Catalyst inlet temperature (C.) | Space velocity ($h^{-1}$) | CO (ppm) | HC (ppm) | NOx (ppm) | $O_2$ (%) |
|---|---|---|---|---|---|---|
| Exhaust gas composition under steady operation | | | | | | |
| High temperature range | 500 | 65,000 | 500 | 100 | 100 | 4 |
| High temperature range, high SV range | 450 | 150,000 | 100 | 100 | 500 | 10 |
| Low temperature range | 250 | 40,000 | 1000 | 300 | 100 | 8 |
| Medium temperature range | 300 | 65,000 | 700 | 200 | 100 | 7 |
| High temperature range, ultra-high SV range | 450 | 170,000 | 300 | 1000 | 1000 | 5 |

TABLE 2

| HC/NOx ratio at fuel injection | HC/NOx ratio |
|---|---|
| High temperature range | 8 |
| High temperature range, high SV range | 6.6 |
| Low temperature range | 17.5 |
| Medium temperature range | 9 |
| High temperature range, ultra-high SV range | 6 |

The result is shown in FIGS. 1 to 5.

Figure 1:
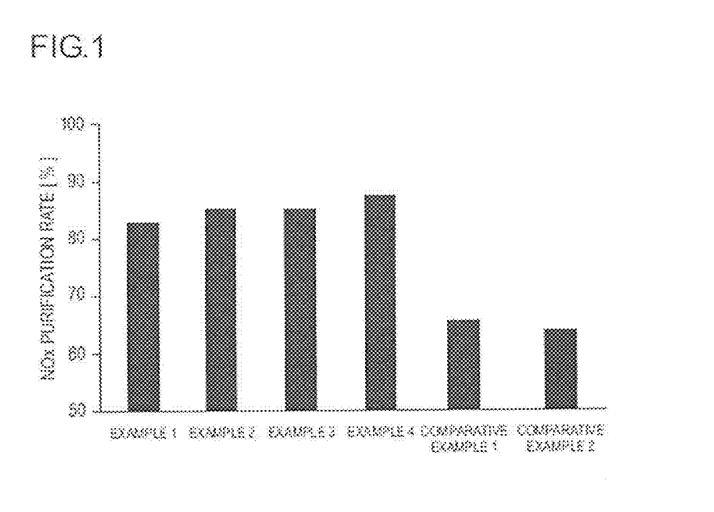
FIG. 1 is a graph showing the mean NOx purification rates (%) of exhaust gas purification catalysts for a lean burn engine in Examples and Comparative Examples when being steadily evaluated at a catalyst inlet temperature of 500° C. and a space velocity of 65,000 $h^{-1}$.

FIG. 1 is a graph showing the mean NOx purification rate s (%) of the completed catalysts (A) to (D), (F) and (G) when being steadily evaluated at a catalyst inlet temperature of 500° C. (high temperature range) and a space velocity of 65,000 $h^{-1}$. It was indicated that the completed catalysts (A) to (D) in Examples 1 to 4 had approximately 30% higher NOx purification rate in comparison with the completed catalysts (F) and (G) in the Comparative Examples.

Figure 2:
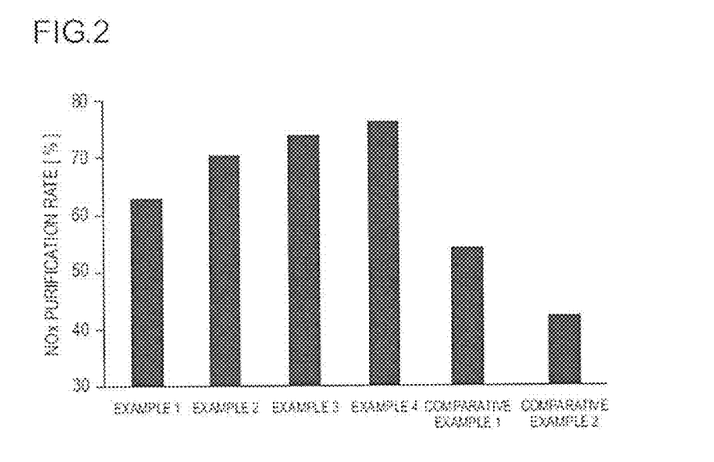
FIG. 2 is a graph showing the mean NOx purification rates (%) of exhaust gas purification catalysts for a lean burn engine of Examples and Comparative Examples when being steadily evaluated at a catalyst inlet temperature of 450° C. and a space velocity of 150,000 $h^{-1}$.

FIG. 2 is a graph showing the mean NOx purification rate s (%) of the completed catalysts (A) to (D), (F) and (G) when being steadily evaluated at a catalyst inlet temperature of 450° C. (high temperature range) and a space velocity of 150,000 $h^{-1}$ (high SV range). It was indicated that the completed catalysts (A) to (D) in Examples 1 to 4 had approximately 20 to 40% higher NOx purification rate in comparison with the completed catalysts (F) and (G) in the Comparative Examples.

Figure 3:
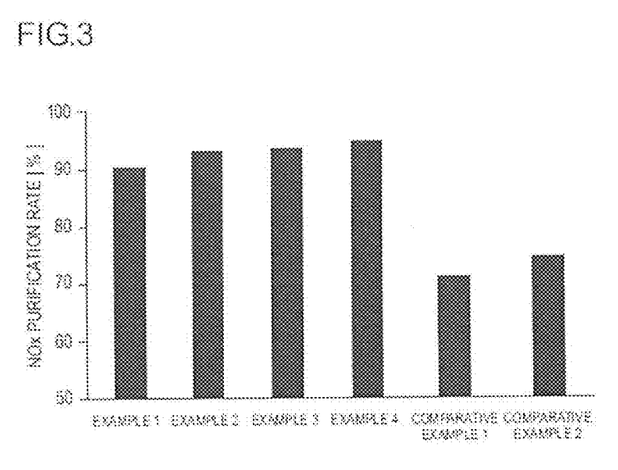
FIG. 3 is a graph showing the mean NOx purification rates (%) of exhaust gas purification catalysts for a lean burn engine of Examples and Comparative Examples when being steadily evaluated at a catalyst inlet temperature of 250° C. and a space velocity of 40,000 $h^{-1}$.

FIG. 3 is a graph showing the mean NOx purification rate s (%) of the completed catalysts (A) to (D), (F) and (G) when being steadily evaluated at a catalyst inlet temperature of 250° C. (low temperature range) and a space velocity of 40,000 $h^{-1}$. It was indicated that the completed catalysts (A) to (D) in Examples 1 to 4 had approximately 30% higher NOx purification rate in comparison with the completed catalysts (F) and (G) in the Comparative Examples.

Figure 4:
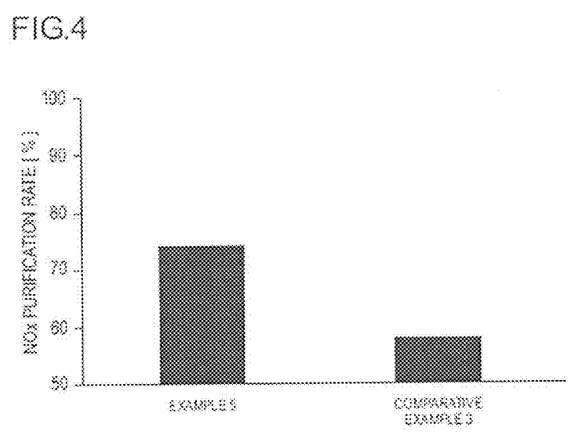
FIG. 4 is a graph showing the mean NOx purification rates (%) of the exhaust gas purification catalysts for a lean burn engine of an Example and Comparative Example when being steadily evaluated at a catalyst inlet temperature of 300° C. and a space velocity of 65,000 h$^{-1}$.

FIG. 4 is a graph showing the mean NOx purification rate s (%) of the completed catalysts (E) and (H) when being steadily evaluated at a catalyst inlet temperature of 300° C. (medium temperature range) and a space velocity of 65,000 $h^{-1}$. It was indicated that the completed catalyst (E) in Example 5 had just under 30% higher NOx purification rate in comparison with the completed catalyst (H) in Comparative Example 3.

Figure 5:
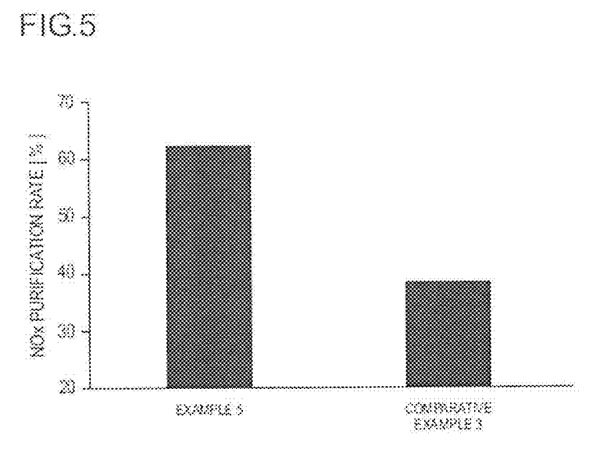
FIG. 5 is a graph showing the mean NOx purification rates (%) of the exhaust gas purification catalysts for a lean burn engine of an Example and Comparative Example when being steadily evaluated at a catalyst inlet temperature of 450° C. and a space velocity of 170,000 h$^{-1}$.

FIG. 5 is a graph showing the mean NOx purification rate s (%) of the completed catalysts (E) and (H) when being steadily evaluated at a catalyst inlet temperature of 450° C. (high temperature range) and a space velocity of 170,000 $h^{-1}$ (ultra-high SV range). It was indicated that the completed catalyst (E) in Example 5 had approximately 60% higher NOx purification rate in comparison with the completed catalyst (H) in Comparative Example 3.

INDUSTRIAL APPLICABILITY

The present invention may be suitably used for treatment of an exhaust gas from a lean burn engine. In particular, it is possible to purify NOx at a low temperature range, and further exhibit high NOx purification performance even at high temperature range or high SV condition.

This application is based on Japanese Patent Application No. 2014-009810 filed on Jan. 22, 2014, the content of which is hereby incorporated by reference in its entirety into this application.

The invention claimed is:

1. An exhaust gas purification catalyst for a lean burn engine, including two or more catalyst layers laminated on a three-dimensional structure
   wherein each of said catalyst layers comprises
   a noble metal, and
   a single-metal oxide of cerium or a composite oxide of cerium oxide and at least one selected from a group consisting of α-alumina ($Al_2O_3$), γ-alumina, δ-alumina, η-alumina, θ-alumina, titania ($TiO_2$), lanthana ($La_2O_3$), and silica ($SiO_2$),
   wherein an amount of ceria included in the single-metal oxide or the composite oxide per 1 L of the catalyst is 140 to 300 g/L, and in the whole catalyst, a proportion of the ceria is 50 to 98% by mass with respect to a whole coated amount,
   wherein the two or more catalyst layers comprises ceria in an amount of 50% by mass or more based on the total amount of ceria in said catalyst, and each catalyst layer comprises the noble metal in an amount of 0.1% by mass or more with respect to an amount of the ceria included in the same catalyst layer.

2. The exhaust gas purification catalyst for a lean burn engine according to claim 1, wherein the catalyst component further comprises a promoter including at least one element selected from the group consisting of alkali metal, alkaline earth metal, rare earth (except cerium) and magnesium, and a supported amount of the promoter per 1 L of the catalyst is 0 to 150 g/L.

3. The exhaust gas purification catalyst for a lean burn engine according to claim 2, wherein the promoter comprises at least one element selected from the group consisting of sodium, potassium, barium, strontium, lanthanum and magnesium.

4. The exhaust gas purification catalyst for a lean burn engine according to claim 1, wherein the noble metal comprises at least one selected from the group consisting of palladium, platinum and rhodium.

5. A method for producing the exhaust gas purification catalyst for a lean burn engine according to claim 1, comprising supporting the catalyst component on the three-dimensional structure.

6. The method for producing the exhaust gas purification catalyst for a lean burn engine according to claim 5, comprising:
forming the first catalyst layer on the three-dimensional structure; and
forming the second catalyst layer on the first catalyst layer.

7. A method for purifying an exhaust gas, comprising bringing the exhaust gas purification catalyst for a lean burn engine according to claim 1 into contact with an exhaust gas from a lean burn engine.

8. The method for purifying an exhaust gas according to claim 7, wherein the exhaust gas from a lean burn engine is an exhaust gas in an oxidative atmosphere (lean) into which a reductant has been regularly introduced.

9. The method for purifying an exhaust gas according to claim 8, wherein the exhaust gas from a lean burn engine has a molar ratio (HC/NOx) of HC (methane conversion) to NOx included in the exhaust gas at a time when the reductant is introduced into the exhaust gas of from 1 to 50.

10. The method for purifying an exhaust gas according to claim 7, comprising bringing the catalyst for a lean burn engine into contact with the exhaust gas from a lean burn engine at a catalyst inlet temperature of 150 to 250° C. and at a space velocity (SV) of 30,000 to 100,000 $h^{-1}$.

11. The method for purifying an exhaust gas according to claim 7, comprising bringing the catalyst for a lean burn engine into contact with the exhaust gas from a lean burn engine at a catalyst inlet temperature of 250 to 700° C. and at a space velocity (SV) of 30,000 to 200,000 $h^{-1}$.

12. The method for purifying an exhaust gas according to claim 7, comprising bringing the catalyst for a lean burn engine into contact with the exhaust gas from a lean burn engine at a catalyst inlet temperature of 400 to 700° C. and at a space velocity (SV) of 100,000 to 200,000 $h^{-1}$.

13. The exhaust gas purification catalyst for a lean burn engine according to claim 1, wherein the catalyst component further comprises at least one refractory inorganic oxide, and
the refractory inorganic oxide has a BET specific surface area of 50 to 750 $m^2/g$.

14. The exhaust gas purification catalyst for a lean burn engine according to claim 1, further including a refractory inorganic oxide comprising at least one selected from the group consisting of α-alumina, γ-alumina, δ-alumina, η-alumina, θ-alumina, titania, zirconia, lanthana, silica, alumina-titania, alumina-zirconia, alumina-lanthana, titania-zirconia, zeolite, and silica-alumina.

15. The exhaust gas purification catalyst for a lean burn engine according to claim 1, wherein the catalyst component further comprises a promoter including at least one element selected from the group consisting of alkali metal, alkaline earth metal, rare earth (except cerium) and magnesium, and a supported amount of the promoter per 1 L of the catalyst is 5 to 100 g/L.

16. The exhaust gas purification catalyst for a lean burn engine according to claim 1, wherein the catalyst component comprises the noble metal and the single-metal oxide of cerium.

17. The exhaust gas purification catalyst for a lean burn engine according to claim 1, wherein proportions of ceria included in each catalyst layer is 50% by mass or more respectively.

* * * * *